United States Patent
Balachandran et al.

(10) Patent No.: US 11,594,949 B2
(45) Date of Patent: Feb. 28, 2023

(54) CONTROL OF MULTI-CHANNEL DRIVE

(71) Applicant: Hamilton Sundstrand Corporation, Charlotte, NC (US)

(72) Inventors: Ajith Balachandran, Derby (GB); Stephen Minshull, Bromsgrove (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 121 days.

(21) Appl. No.: 17/004,189

(22) Filed: Aug. 27, 2020

(65) Prior Publication Data
US 2021/0167682 A1 Jun. 3, 2021

(30) Foreign Application Priority Data
Dec. 3, 2019 (EP) ..................... 19275137

(51) Int. Cl.
*H02M 1/32* (2007.01)
*H02M 3/158* (2006.01)

(52) U.S. Cl.
CPC ........... *H02M 1/32* (2013.01); *H02M 3/1584* (2013.01); *H02M 1/327* (2021.05)

(58) Field of Classification Search
CPC ....... H02M 1/32; H02M 3/1584; H02M 1/327
See application file for complete search history.

(56) References Cited

U.S. PATENT DOCUMENTS

| | | | |
|---|---|---|---|
| 6,795,009 B2 | 9/2004 | Duffy et al. | |
| 7,739,005 B1* | 6/2010 | Tang | B60L 3/10 701/69 |
| 7,847,532 B2 | 12/2010 | Potter et al. | |
| 9,286,250 B2 | 3/2016 | Harada et al. | |
| 2003/0193305 A1* | 10/2003 | Crowley | B62D 5/0481 318/432 |
| 2016/0241182 A1 | 8/2016 | Kuramitsu | |
| 2017/0070178 A1 | 3/2017 | Koseki et al. | |

FOREIGN PATENT DOCUMENTS

| | | |
|---|---|---|
| EP | 0588628 A1 | 3/1994 |
| EP | 3367556 A1 | 8/2018 |

OTHER PUBLICATIONS

"Transformative Vertical Flight Workshop—Aug. 3, 2015—" (https://nari.arc.nasa.gov/sites/default/files/attachments/Korbinian-TVFW-Aug2015.pdf) 16 pages.
Balachandran, et al., "Design, construction, and testing of an aero-engine starter-generator for the more-electric aircraft," in The Journal of Engineering, vol. 2019, No. 17, pp. 3474-3478, 2019.
European Search Report Application No. 19275137.8, dated May 19, 2020, 6 pages.

* cited by examiner

*Primary Examiner* — Rafael O De Leon Domenech
(74) *Attorney, Agent, or Firm* — Cantor Colburn LLP

(57) ABSTRACT

A power converter assembly comprises a plurality of power converter channels each arranged to provide a three-phase output to an electrical machine having a multiple of three-phase windings. The power converter assembly further comprises control means arranged to provide a torque demand signal to the plurality of power converter channels to provide, together, a desired torque output to drive the machine and a temperature sensing means to detect temperature in the power channels and/or at the windings of the machine. The control means is arranged to determine the proportion of the desired torque output to be provided by each channel based on the detected temperature.

11 Claims, 6 Drawing Sheets

CONTROL OF MULTI-CHANNEL DRIVE

FOREIGN PRIORITY

This application claims priority to European Patent Application No. 19275137.8 filed Dec. 3, 2019, the entire contents of which is incorporated herein by reference.

TECHNICAL FIELD

The present disclosure is concerned with the control of multi-channel power systems.

BACKGROUND

Where power is required to drive a load e.g. a motor, the power to the motor is often controlled by a power converter or drive system.

Power converters are used to convert AC to DC, DC to AC, AC to AC and/or DC to DC according to load and application requirements. In this disclosure an Inverter (DC to AC) is used as an example.

For applications that demand higher power densities, such as a propulsion application e.g. in aircraft, a multi-channel power system is seen to be a preferred solution.

Such multi-channel power drives are known from e.g. A. Balachandran, M. Boden, Z. Sun, S. J. Forrest, J. D. Ede and G. W. Jewell, "Design, construction, and testing of an aero-engine starter-generator for the more-electric aircraft," in The Journal of Engineering, vol. 2019, no. 17, pp. 3474-3478, 2019. doi: 10.1049/joe.2018.8235, EP3367556 and "Transformative Vertical Flight Workshop—Aug. 3, 2015—" (https://nari.arc.nasa.gov/sites/default/files/attachments/Korbinian-TVFW-Aug2015.pdf)

Generally, the required power output is controlled equally from the different channels. E.g. in a two-channel system 50% of the required power output is provided by one channel and 50% by the other channel.

A problem with such multi-channel systems is that they tend to trip when a high temperature condition occurs on the motor windings or power modules. This leads to loss of system availability which becomes more critical for propulsion applications.

Another problem is that the two channels are assumed to be stressed equally over operational lifetime. However, without any dynamic control mechanism this might not be the case, as one of the machine/converter channels might be stressed more than the other.

SUMMARY

The present disclosure provides a system and method for controlling the power output from each channel of a multi-channel power converter system based on the active state of the drive system and/or the load as indicated by measured temperature, currents In accordance with one aspect, there is provided a power converter assembly as defined in claim 1.

According to another aspect, there is provided as method as defined in claim 7.

DETAILED DESCRIPTION

The control according to the present disclosure will be described in more detail below, by way of example only, with reference to the drawings. The description is provided for a two-channel power converter, but can equally apply to power converters with more than two channels.

Figure 1:
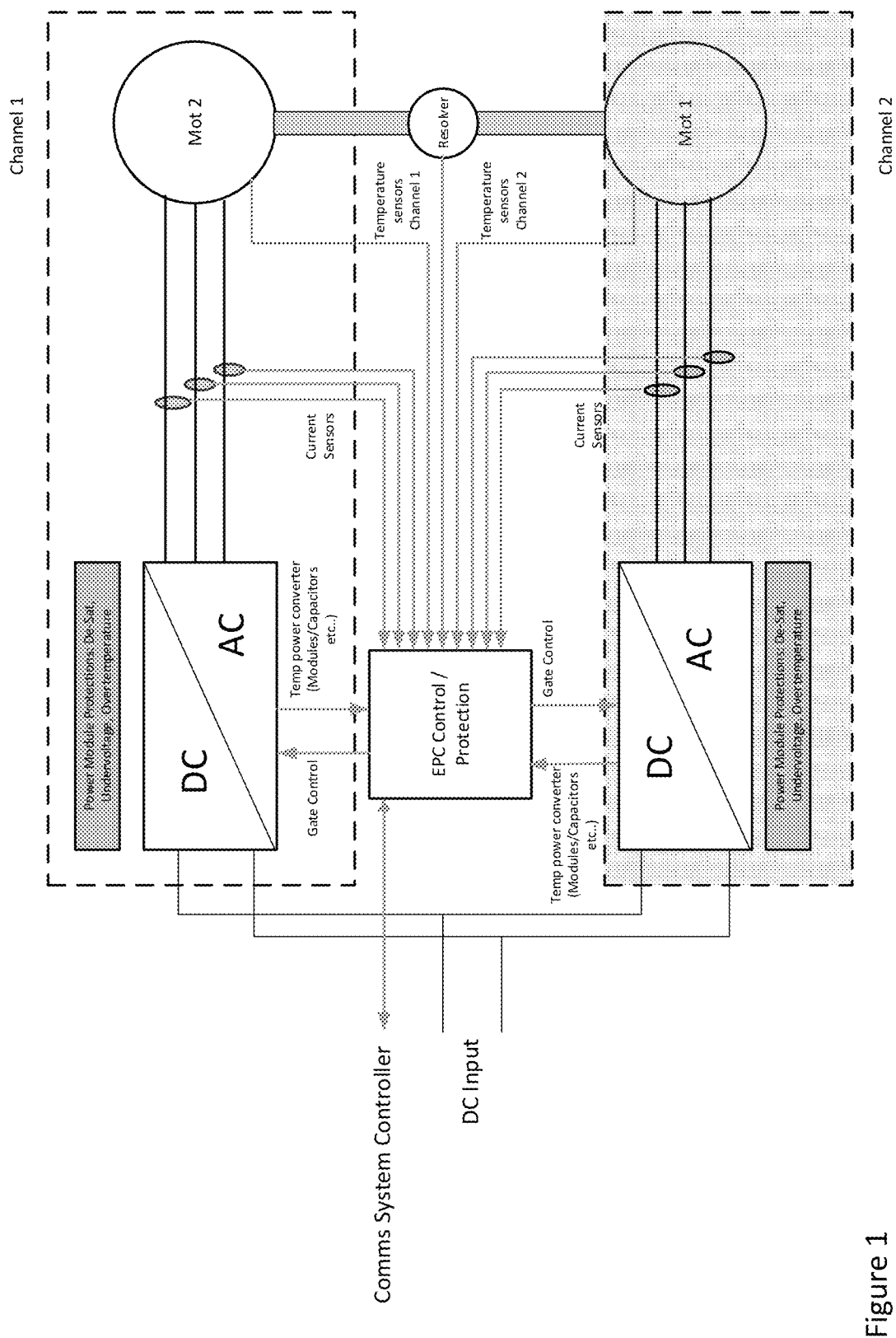
FIG. 1 is a circuit diagram of a conventional two-channel power drive.

In the example of a conventional system as shown in FIG. 1, the power converter comprises a two-channel architecture with a common DC link. A dual wound three-phase machine is housed in a common stator, and two power converters control the two sets of windings.

The power converters share a common DC link.

The conventional control of such a multichannel power converter system will now be described with reference to FIGS. 2 to 4.

The standard operation of a multi-channel power converter will not be described in detail, as this is well known in the art. In summary, a multi-channel power converter provides power to a multiphase electrical machine or motor. The machine is a dual wound, three-phase machine—i.e. 2×three phases (6 phases). The same phase inputs of the power converter channels are connected to each other and to the respective phase windings of the machine. The converter is controlled by a controller that determines the torque to be provided to the machine.

Figure 2:
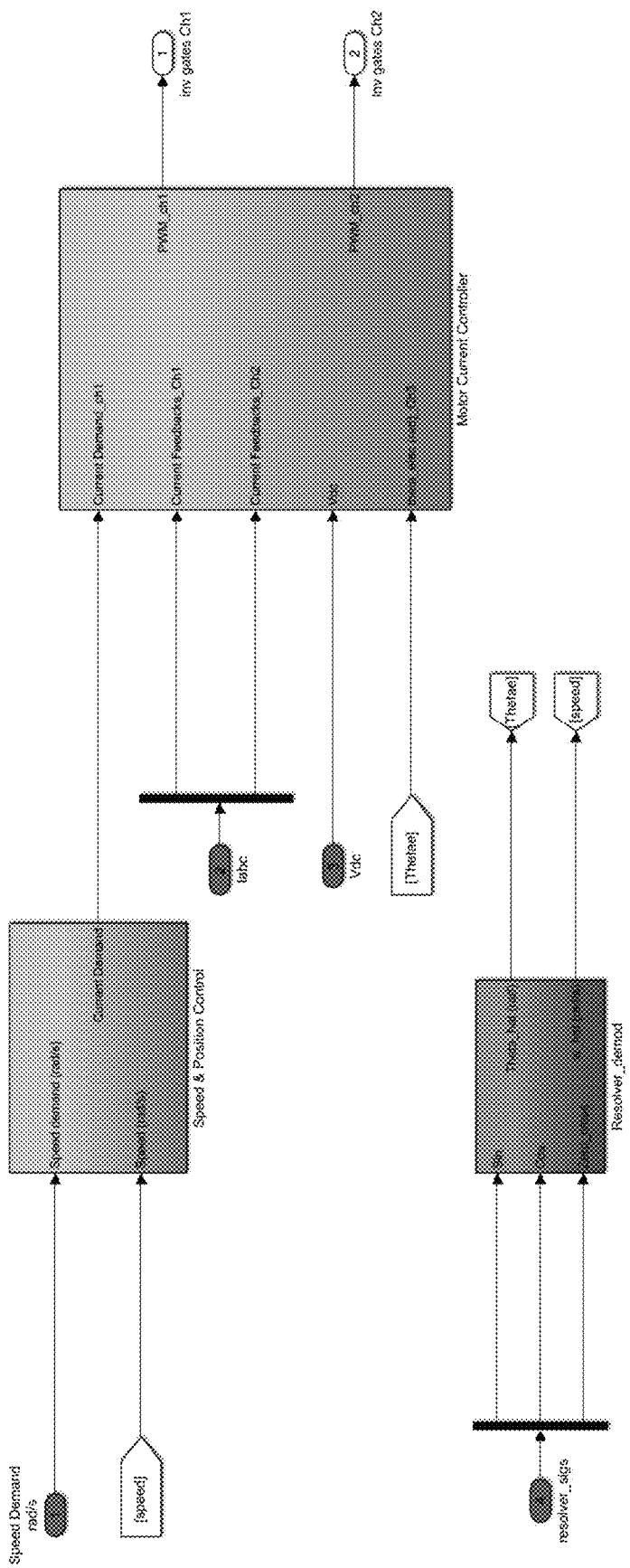
FIG. 2 is a circuit diagram of a conventional machine control architecture.
Figure 3:
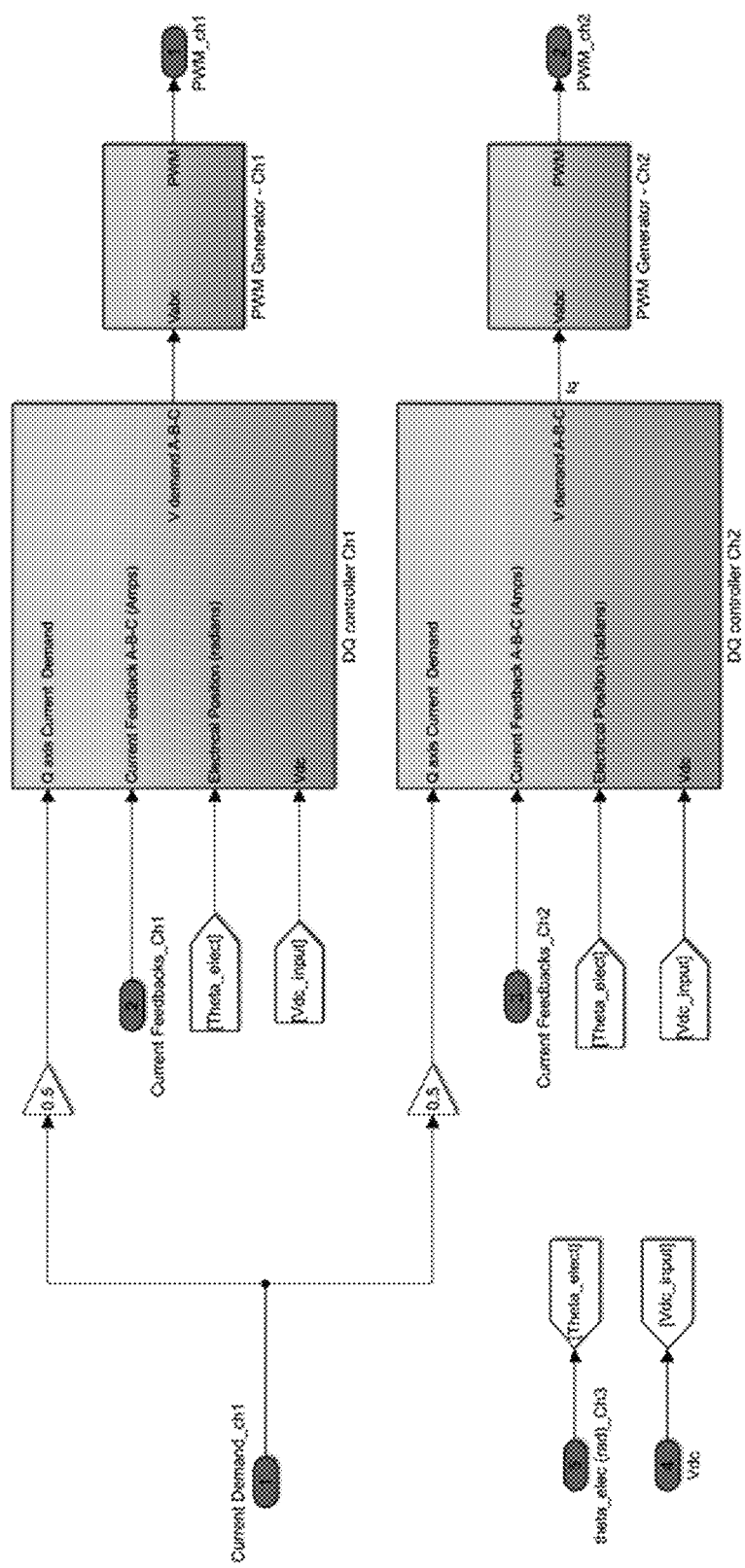
FIG. 3 shows a two-channel current controller architecture.

FIG. 2 shows the main functions for motor control. This shows nested speed and multiple current controllers.

The torque/current demand provided to the current controllers by the speed controller or the external system are splits equally between the two channels to provide, together, the required output torque to the motor. This can be seen with reference to FIG. 3.

A number of temperature sensors are used to monitor the temperature of the motor and the components of the power converter channels. The power converter is configured to trip if the temperature of any of these sensors exceeds a threshold.

Figure 4:
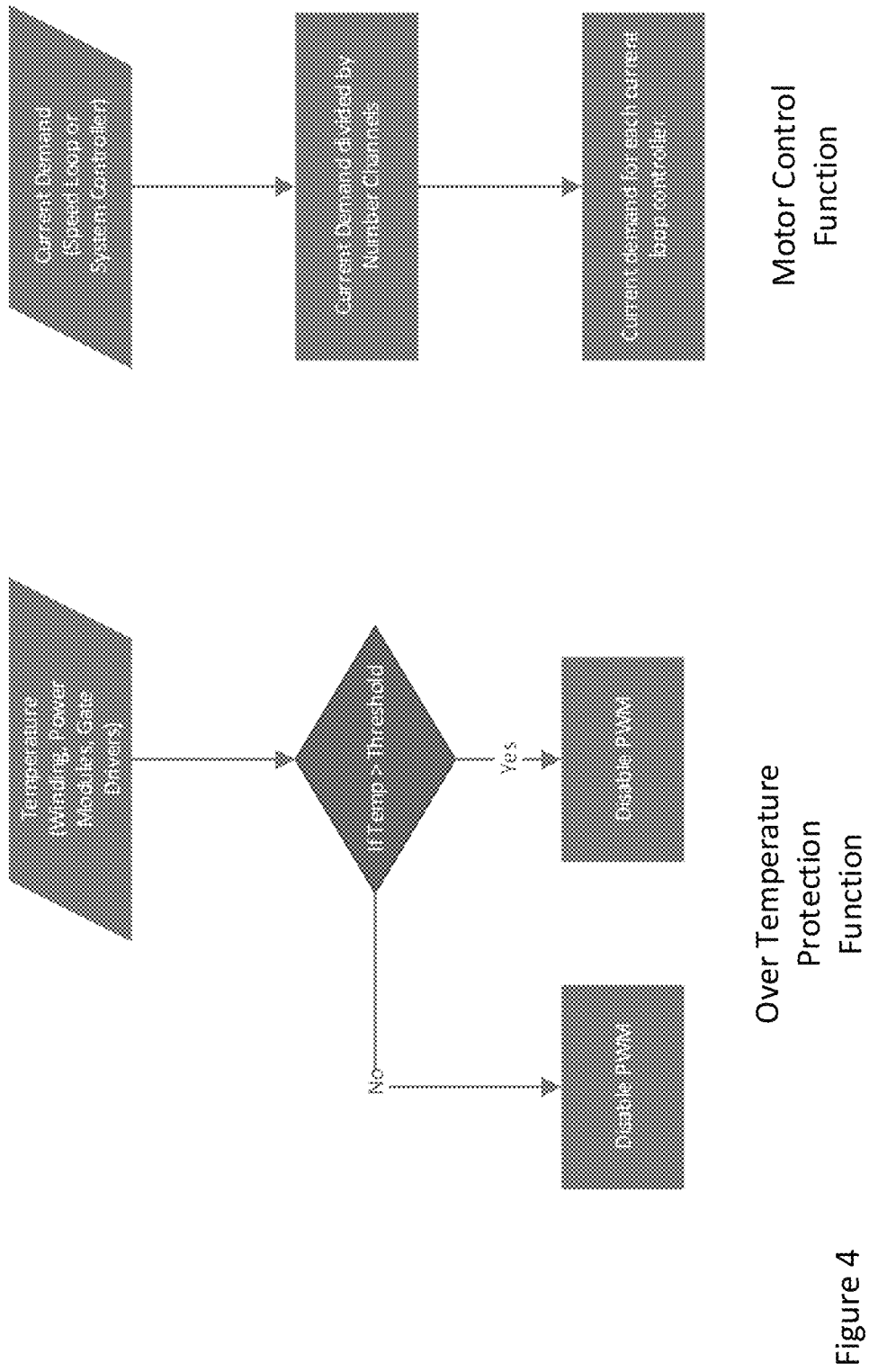
FIG. 4 shows, schematically, the conventional control and protection function of a power drive.

In summary, as shown schematically in FIG. 4, the control and protection systems are segregated. The motor control function is provided as described above. In a separate control logic, the system is protected against over-temperature. If a measured temperature (e.g. at the motor windings, power modules, gate drivers) exceeds a threshold, the power channels are tripped or disabled.

The present disclosure presents a system and method for dynamically controlling the output power from each of the channels based on temperature feedback received from the motor and the power converter channels.

Figure 5:
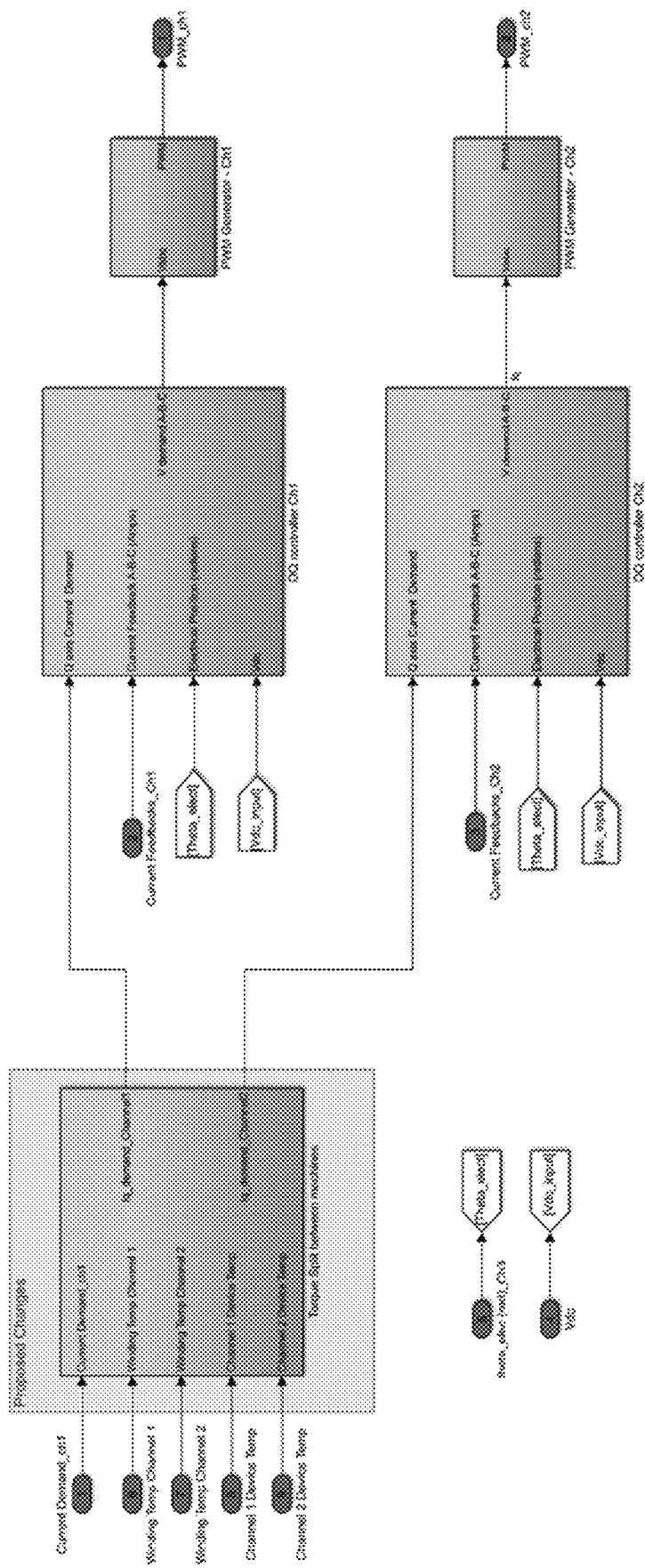
FIG. 5 is a modified two channel controller architecture according to this disclosure.
Figure 6:
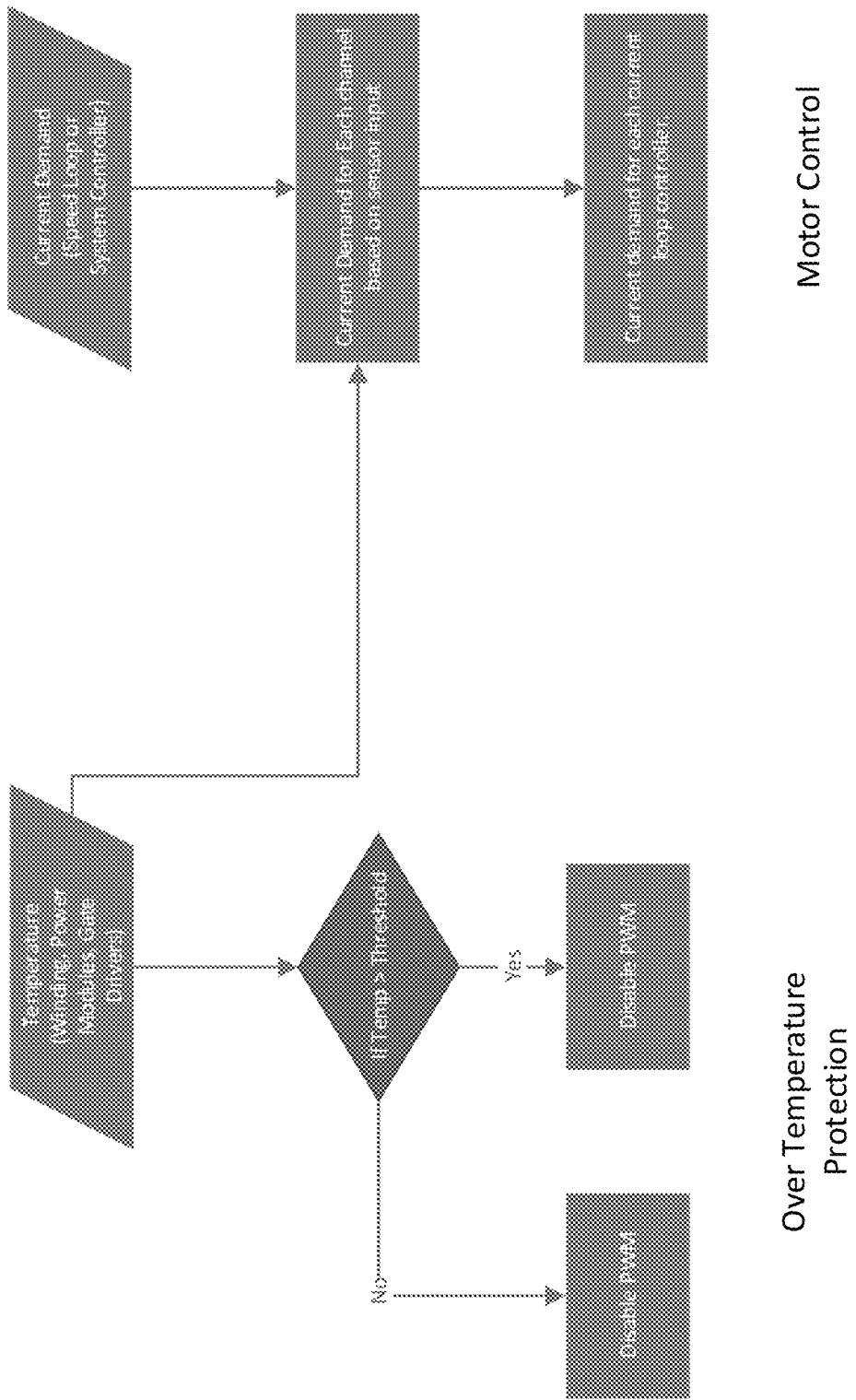
FIG. 6 shows, schematically, the control and protection functions according to this disclosure.

An example of the system is shown schematically in FIG. 5 and the functions can be seen in FIG. 6.

As can be seen, the conventional system is modified such that the temperature measurement is used in the motor control and, in particular, in controlling the proportion of the total required output to be provided by each channel.

The control of the split of the output from each channel may be performed by a central control block. The control block receives a current demand and calculates the current split between the channels based on the temperature measurements and current feedbacks.

Alternatively, the system may have a master/slave configuration. Current demand is received from the system controller and one current loop operates as a master loop while the other operates as a slave.

An alternative configuration uses a distributed control block that receives current demand from the system controller and each channel has its own control device that calculates the current demand separately.

As mentioned above, the key feature is that the split between channels is dependent on measured temperature. There are various ways in which the split can be calculated, for example, using a look-up table, using an observer, or using mathematical equations or algorithms.

If, for example, the temperature at channel 2 exceeds that of channel 1, then, using the control of this disclosure, a larger torque demand could be placed on channel 1 and a reduced demand on channel 2. In total, the output torque is maintained to correspond to the torque demand of the system.

Using the control of this disclosure, the machine and converter components are less subject to stress as their performance requirement will be less if they overheat. In this way, the life of the system is increased. Further, if one channel is becoming overstressed—as indicated by excess temperature—the system can still continue to operate by apportioning the power requirement differently between the channels. The power distribution can be adjusted dynamically and can be adjusted after the system has been built.

The described embodiments are by way of example only. The scope of this disclosure is limited only by the claims.

The invention claimed is:

1. A power converter assembly for driving an aircraft propulsion motor, the assembly comprising:
    a plurality of power converter channels each arranged to provide a three-phase output to the aircraft propulsion motor having a multiple of three-phase windings;
    control means arranged to provide a torque demand signal to each of the plurality of power converter channels to provide, together, a desired torque output to drive the machine; and
    temperature sensing means to detect temperature in the power channels and at the windings of the machine; whereby
    the control means is arranged to determine the proportion of the desired torque output to be provided by each channel based on the detected temperature.

2. The power converter assembly of claim 1, comprising two power channels for driving a dual wound three-phase aircraft propulsion motor.

3. The power converter assembly of claim 1, wherein the control means comprises a control block common to all channels.

4. The power converter assembly of claim 1, wherein the control means comprises a distributed control block comprising a respective control device for each channel.

5. The power converter assembly of claim 1, wherein the control means determines the proportion using a look-up table of proportion and temperatures.

6. The power converter assembly of claim 1, wherein the control means includes a processor configured to perform an algorithm using measured temperature as an input.

7. A method of determining the split of required output torque provided by respective ones of the plurality of power converter channels of a power converter as recited in claim 1, the method comprising:
    providing a torque demand signal to each of the plurality of power converter channels to provide, together, a desired torquet output to drive the aircraft propulsion motor;
    detecting temperature in the power channels and the windings of the aircraft propulsion motor; and
    determining the proportion of the desired torque output to be provided by each channel based on the detected temperatures.

8. The method of claim 7, whereby temperature measurements are obtained from components of the channels and/or windings of an electric machine driven by the power converter.

9. The method of claim 7, wherein the split is determined using a look-up table of temperatures and splits.

10. The method of claim 7, wherein the split is determined based on an input from an observer.

11. The method of claim 7, wherein the split is determined using an algorithm.

* * * * *